Figure 1:
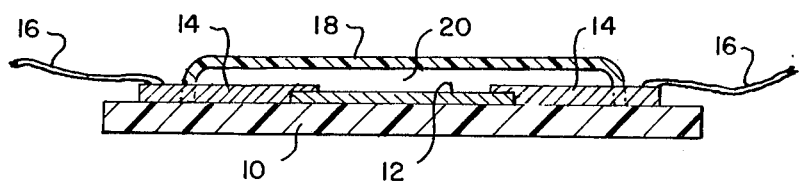

United States Patent [19]

DelVecchio et al.

[11] 4,231,011
[45] Jan. 28, 1980

[54] DISCONTINUOUS METAL FILM RESISTOR AND STRAIN GAUGES

[75] Inventors: Robert M. DelVecchio, Vandergrift; Zvi H. Meiksin, Pittsburgh, both of Pa.

[73] Assignee: University of Pittsburgh, Pittsburgh, Pa.

[21] Appl. No.: 78,486

[22] Filed: Sep. 24, 1979

[51] Int. Cl.³ .............................................. G01L 1/22
[52] U.S. Cl. ................................... 338/2; 29/610 SG; 29/613; 73/726; 338/226; 338/275
[58] Field of Search ........................................ 338/2-6, 338/13, 275, 226; 29/610 SG, 613, 627; 73/720, 721, 726, 727

[56] References Cited

U.S. PATENT DOCUMENTS

| | | | |
|---|---|---|---|
| 3,286,514 | 11/1966 | Anderson | 338/2 X |
| 3,445,800 | 5/1969 | Ambulos et al. | 338/2 |
| 3,475,712 | 10/1969 | Brown | 338/2 |
| 3,863,192 | 1/1975 | Grey | 338/2 |
| 4,023,562 | 5/1977 | Hynecek et al. | 73/727 X |

*Primary Examiner*—C. L. Albritton
*Attorney, Agent, or Firm*—Buell, Blenko & Ziesenheim

[57] ABSTRACT

An improved discontinuous film resistor and strain gauge is disclosed wherein the discontinuous metal film is maintained in a constant humidity in the range of 15% to 45% thereby substantially increasing the life of the strain gauge.

6 Claims, 2 Drawing Figures

U.S. Patent  Oct. 28, 1980  4,231,011

DISCONTINUOUS METAL FILM RESISTOR AND STRAIN GAUGES

This invention relates to discontinuous metal film resistors and strain gauges and particularly to stabilized discontinuous metal film resistors and strain gauges which resist the deterioration commonly associated with such films.

Discontinuous metal film strain gauges have gauge factors on the order of 100 to 200. This high level of sensitivity coupled with the potential for miniaturization makes them of great interest. Unfortunately, the principal problem with such strain gauges is their instability with time. Over time there occurs an increase in resistance which has been believed to be due to island coalescence or agglomeration. Many attempts have been made, in the past, to control this problem and more particularly to control island coalescence or agglomeration in an effort to stabilize such discontinuous film resistors and strain gauges.

Studies of the properties of discontinuous metal films and their problems have proceeded for more than two decades. Electron microscope studies reveal the fact that these films are made up of individual metal grains roughly 100 Å in diameter separated by distances of a few Å. The conduction of current in these films is ascribed to quantum mechanical tunnelling of the electrons between grains. This process, which gives the films high sheet resistance (from a few to many M$\Omega$'s), also explains their high sensitivity. The gauge factor, $\alpha$, which is defined as the ratio of the fractional resistance change to the fractional length change or strain ($\alpha = (\Delta R/R/\Delta l/l)$), is, as mentioned above, about 100 to 200. In contrast, for ordinary thin film, wire, or foil strain gauges $\alpha \approx 1$ to 5. Over a period of time the grains tend to coalesce or aggregate, increasing the average distance between grains resulting in an increase in resistance.

We have discovered that this problem of coalescence or aggregation can be controlled by controlling the humidity of the environment in which the discontinuous film is held. We have also found that this can be further aided by irradiation of the substrate surface on which the discontinuous metal film is applied. However, whether the substrate surface is modified or not, humidity is the most important parameter determining long term stability and it is essential that the humidity of the environment for the discontinuous film be controlled. We have found the control of humidity is best accomplished by encapsulating the discontinuous film within the desired humidity.

The mechanism by which humidity stabilizes these gauges is not known to us. It may be any of a number of mechanisms, however, it is clear that humidity control is essential to longevity. We have found that the life of the strain gauge is directly related to the humidity of the atmosphere in which it is contained. Gauges stored in a dessicator developed resistances too high to measure with a wheatstone bridge in a matter of one to two weeks. On the other hand gauges stored in 100% humidity showed a drop in resistance from an initial value of about 5 M$\Omega$ to a final value of about 50 k$\Omega$ accompanied by a drop in gauge factor from 80-100 to 1-10. Gauges stored in ordinary air having 28% humidity stabilize to easily measurable resistance values and desirable gauge factors of about 40-110 after some initial variation. Although the gauge performed well at 28% humidity, similar performance can be expected if the resistor strain gauge is maintained in an environment having humidity within the range from 15% to 45%.

Other details, objects and advantages of the invention will become apparent as a present preferred embodiment of the invention proceeds.

Figure 2:
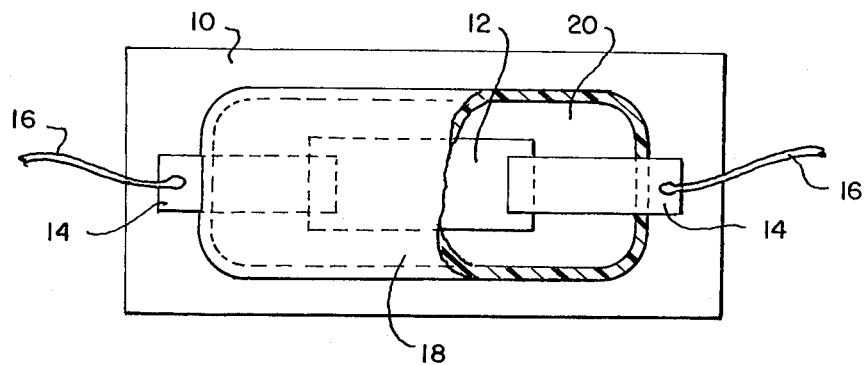

In the accompanying drawings, we have shown a present preferred embodiment of the invention in which:

FIG. 1 is a cross-sectional view of a preferred embodiment of the invention, and FIG. 2 is a plan view of the embodiment of FIG. 1 wherein part of the overlay is cut away to show the discontinuous metal film and electrode.

Referring to the drawings a nonconductive substrate 10 is provided on which a discontinuous metal film 12 has been deposited. Electrodes 14 are attached to the film 12 and wires 16 are connected to the electrodes. The metal film 12 is encapsulated by an overlay 18 in a manner so as to enclose the film in a moisture proof environment 20 thereby maintaining it at a constant predetermined humidity. The metal film may be platinum, gold or other suitable metal. The overlay may be a rubberlike elastomer, hard plastic or other flexible material having low permeability for water vapor. It may in some instances be desirable to use the same material for the overlay 18 and the substrate 10. When attaching the overlay 18 to the substrate we prefer to partially cover the electrodes 14 thereby permitting easy attachment of the wires 16 prior to using the device.

This strain gauge can be used in the conventional manner by gluing it to the workpiece. Alternatively, the film may be deposited on the workpiece and the electrodes and overlay attached thereto.

We prefer to choose overlay material having sufficient flexibility so it will not affect the gauge's measurements. Nevertheless, one should calibrate the gauge after it has been completed to assure that the overlay is not affecting the results.

Other means, besides encapsulation can be used to provide a controlled humidity about the strain gauge. In some applications it may be possible to place a vapor impermeable cover over the gauge and the workpiece. Whenever covers are used they must be designed and positioned so as not to affect the gauge's readings. If the workpiece and gauge can be located in a controlled environment such as a laboratory chamber, the gauge need not be encapsulated provided the humidity in the chamber is kept within the prescribed limits. We have also found that the lifetime of the resistance strain gauge may be further increased by irradiating the portion of the substrate on which the film is deposited. Using a silicon beam we bombarded a glass slide on which the gauge was deposited to produce a displacement of about one surface atom per thousand surface atoms. This increased the lifetime of the gauge by three to seven days depending upon the irradiation levels. An irradiation level of DPA=$0.73 \times 10^{-3}$ increased the lifetime by about three days. A similar increase was experienced for a DPA of $1.8 \times 10^{-3}$. At a DPA=$2.4 \times 10^{-3}$ and DPA=$4 \times 10^{-3}$ the lifetime was increased by about a week.

While we have shown and described a present preferred embodiment of the invention it is to be distinctly understood that the invention is not limited thereto but may be otherwise variously embodied within the scope of the following claims.

We claim:

1. A strain gauge comprising:
   a. a substrate composed of nonconductive material,
   b. a discontinuous metal film on the substrate,
   c. a plurality of electrodes attached to the metal film, and
   d. means for maintaining an environment having a constant humidity in the range of 15% to 45% about the discontinuous metal film.

2. The strain gauge of claim 1 wherein the means for maintaining the constant humidity environment is encapsulation.

3. The strain gauge of claim 2 wherein the gauge is encapsulated by a flexible material.

4. The strain gauge of claim 1 wherein the humidity is 28%.

5. The strain gauge of claim 1 wherein the discontinuous metal film is composed of a metal selected from the group consisting of gold, platinum, chromium and copper.

6. The strain gauge of claim 1 wherein the substrate has been irradiated.

UNITED STATES PATENT AND TRADEMARK OFFICE
CERTIFICATE OF CORRECTION

PATENT NO. : 4,231,011
DATED : January 28, 1980
INVENTOR(S) : ROBERT M. DELVECCHIO and ZVI H. MEIKSIN It is certified that error appears in the above–identified patent and that said Letters Patent are hereby corrected as shown below:

On the Title Page, the issue date of "Jan. 28, 1980" is incorrect, and should read --October 28, 1980--.

Signed and Sealed this

Tenth Day of March 1981

[SEAL]

Attest:

RENE D. TEGTMEYER

Attesting Officer *** Acting Commissioner of Patents and Trademarks